(12) United States Patent
Schindler et al.

(10) Patent No.: US 10,697,850 B2
(45) Date of Patent: Jun. 30, 2020

(54) METHOD FOR TESTING A CONTAINER FOR TIGHTNESS

(71) Applicant: Robert Bosch GmbH, Stuttgart (DE)

(72) Inventors: Wolfram Schindler, Kirchberg (DE); Wolfgang Maurischat, Satteldorf (DE); Thomas Peter, Kloten (CH); Lucien Matthias Drescher, Fichtenau (DE)

(73) Assignee: Robert Bosch GmbH, Stuttgart (DE)

( * ) Notice: Subject to any disclaimer, the term of this patent is extended or adjusted under 35 U.S.C. 154(b) by 82 days.

(21) Appl. No.: 15/919,317

(22) Filed: Mar. 13, 2018

(65) Prior Publication Data

US 2018/0259421 A1 Sep. 13, 2018

(30) Foreign Application Priority Data

Mar. 13, 2017 (DE) .................. 10 2017 204 102

(51) Int. Cl.
*G01M 3/32* (2006.01)
(52) U.S. Cl.
CPC .......... *G01M 3/329* (2013.01); *G01M 3/3245* (2013.01); *G01M 3/3254* (2013.01); *G01M 3/3263* (2013.01)

(58) Field of Classification Search
None
See application file for complete search history.

(56) References Cited

U.S. PATENT DOCUMENTS

| 6,082,184 | A | * | 7/2000 | Lehmann | ............ | G01M 3/3281 |
| | | | | | | 73/49.3 |
| 6,202,477 | B1 | | 3/2001 | Lehmann | | |
| 8,544,315 | B2 | | 10/2013 | Guazzo et al. | | |

* cited by examiner

*Primary Examiner* — Paul M. West
*Assistant Examiner* — Mark A Shabman
(74) *Attorney, Agent, or Firm* — Michael Best & Friedrich LLP

(57) ABSTRACT

A method for testing a container (11) having an interior volume (12) for tightness, comprising the following steps: providing the container (11) in a pressure chamber (10) and reducing pressure within the pressure chamber (10) or increasing pressure within the container (11) as far as a predefined test pressure, ascertaining a pressure profile (100) within the pressure chamber (10) over time, comparing the pressure profile (100) to a reference profile (200) in order to determine whether a leak is present within the container (11), wherein ambient conditions of the container (11) and/or the pressure chamber (10) are monitored and the reference profile (200) is adapted to changing ambient conditions.

10 Claims, 15 Drawing Sheets

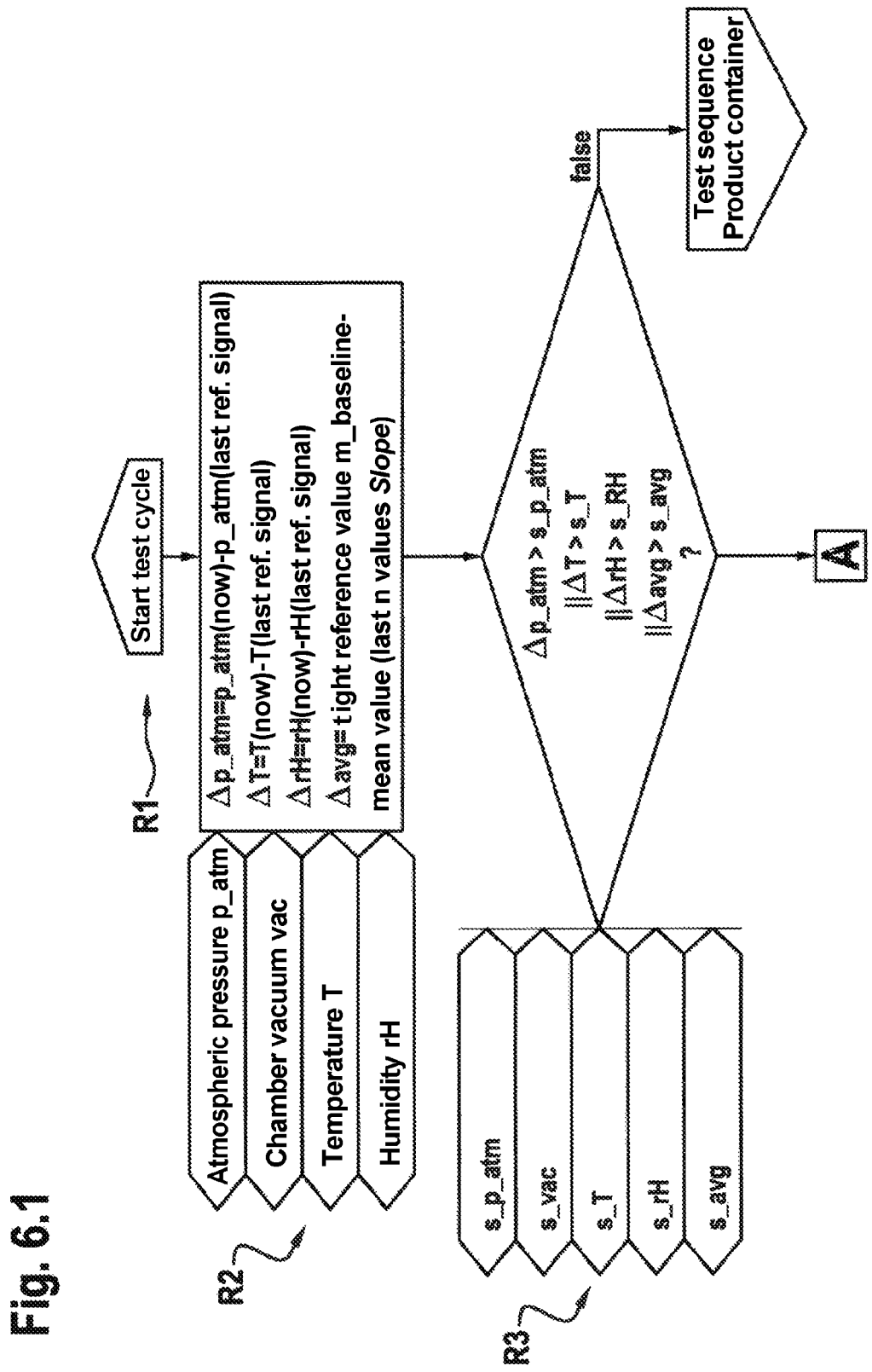
Fig. 6.1

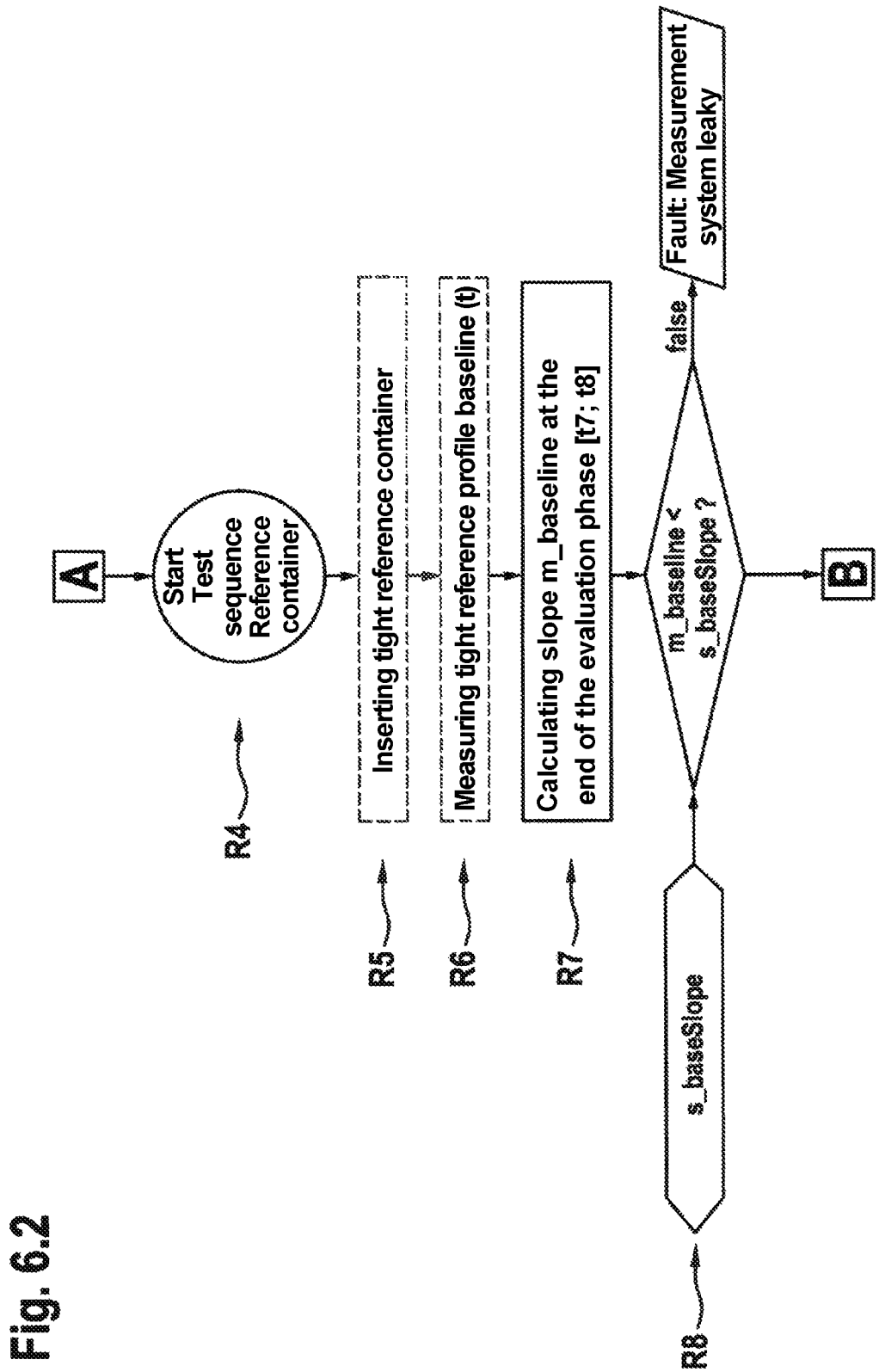
Fig. 6.2

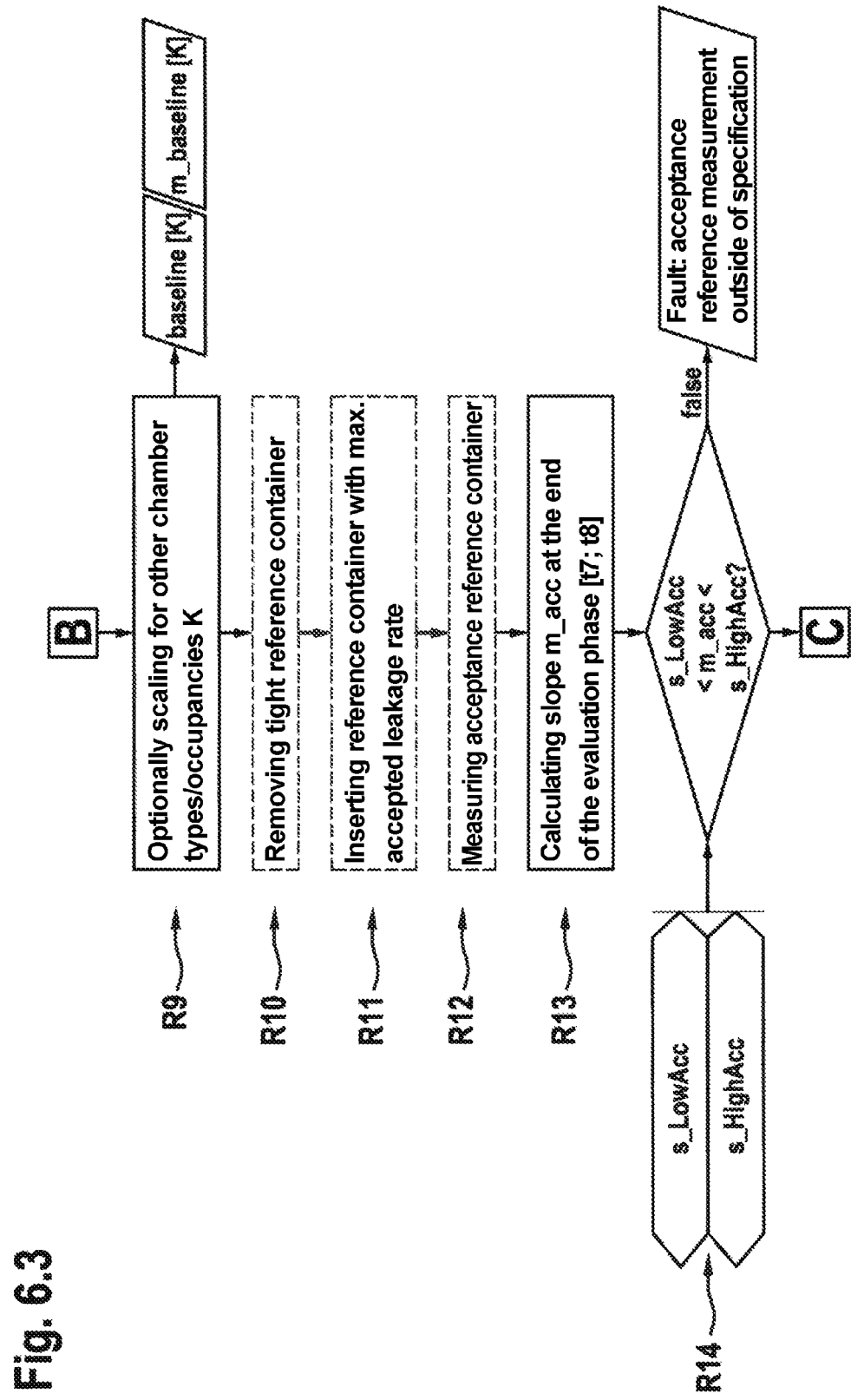
Fig. 6.3

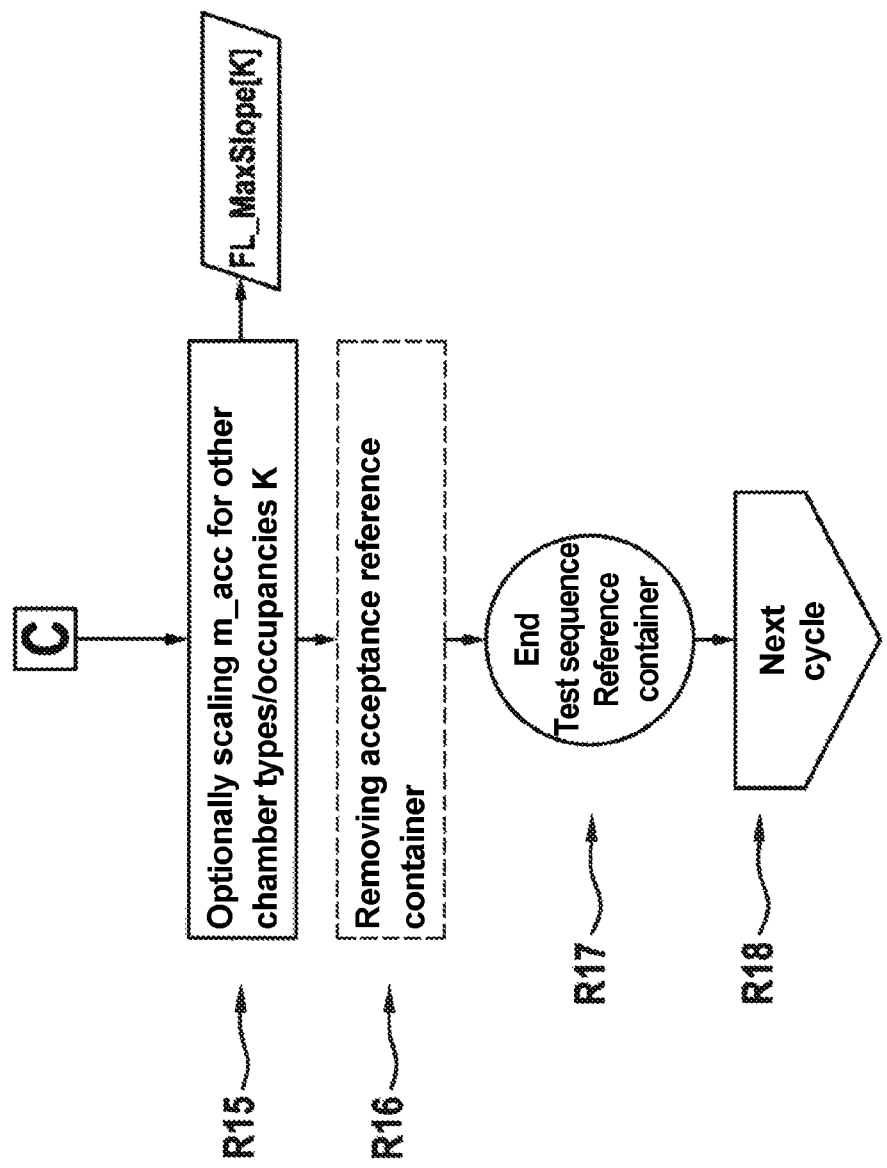
Fig. 6.4

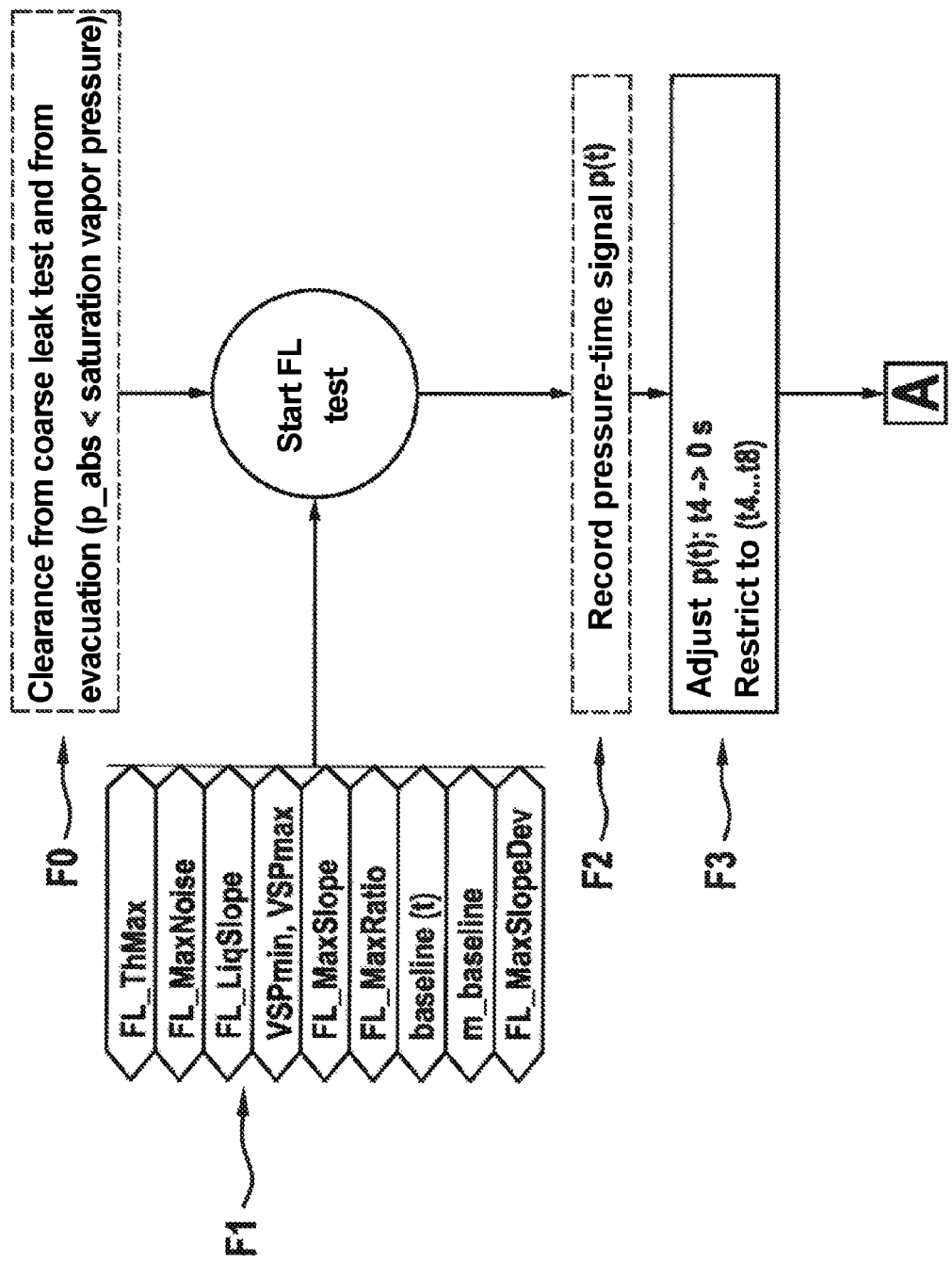
Fig. 7.1

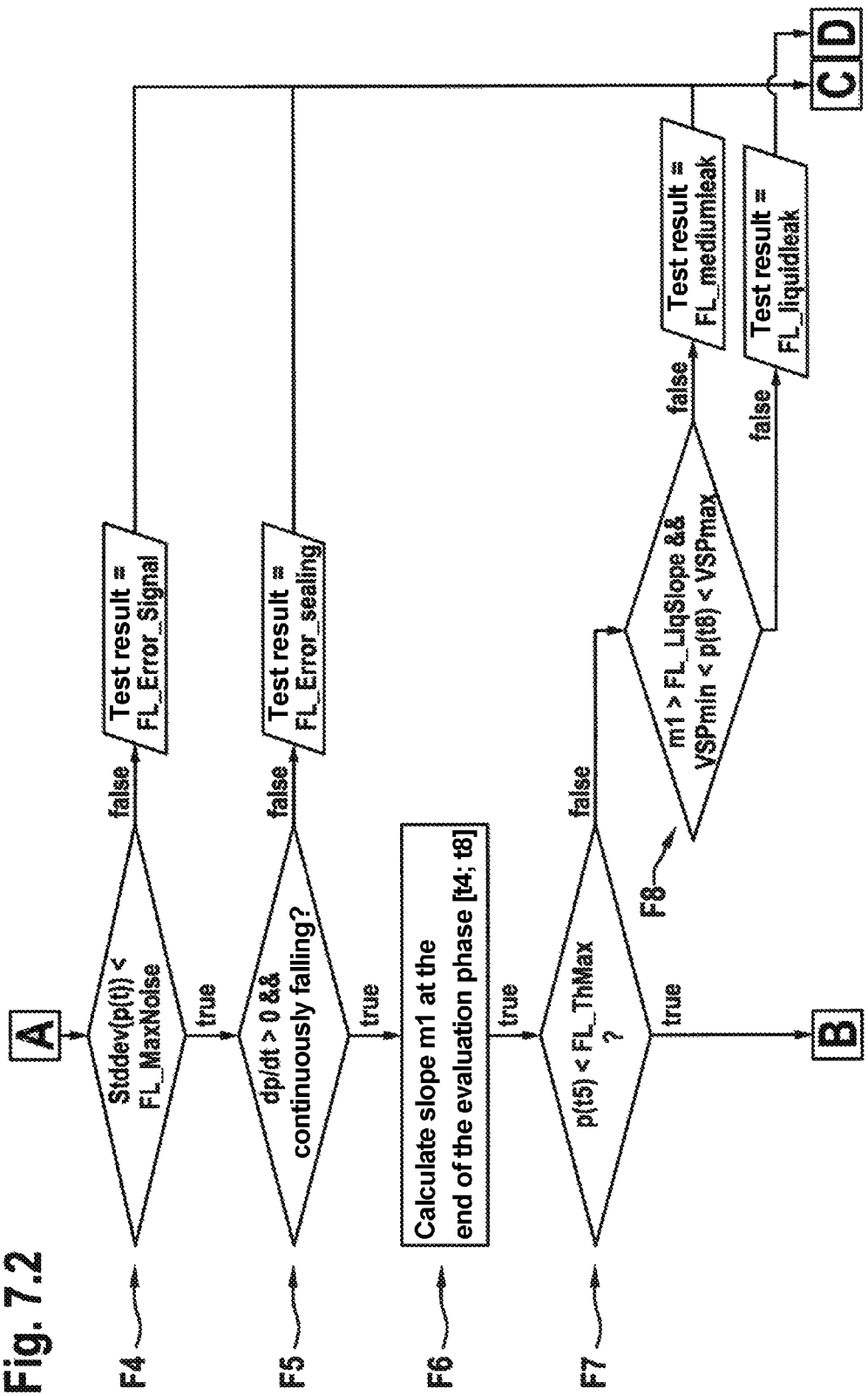
Fig. 7.2

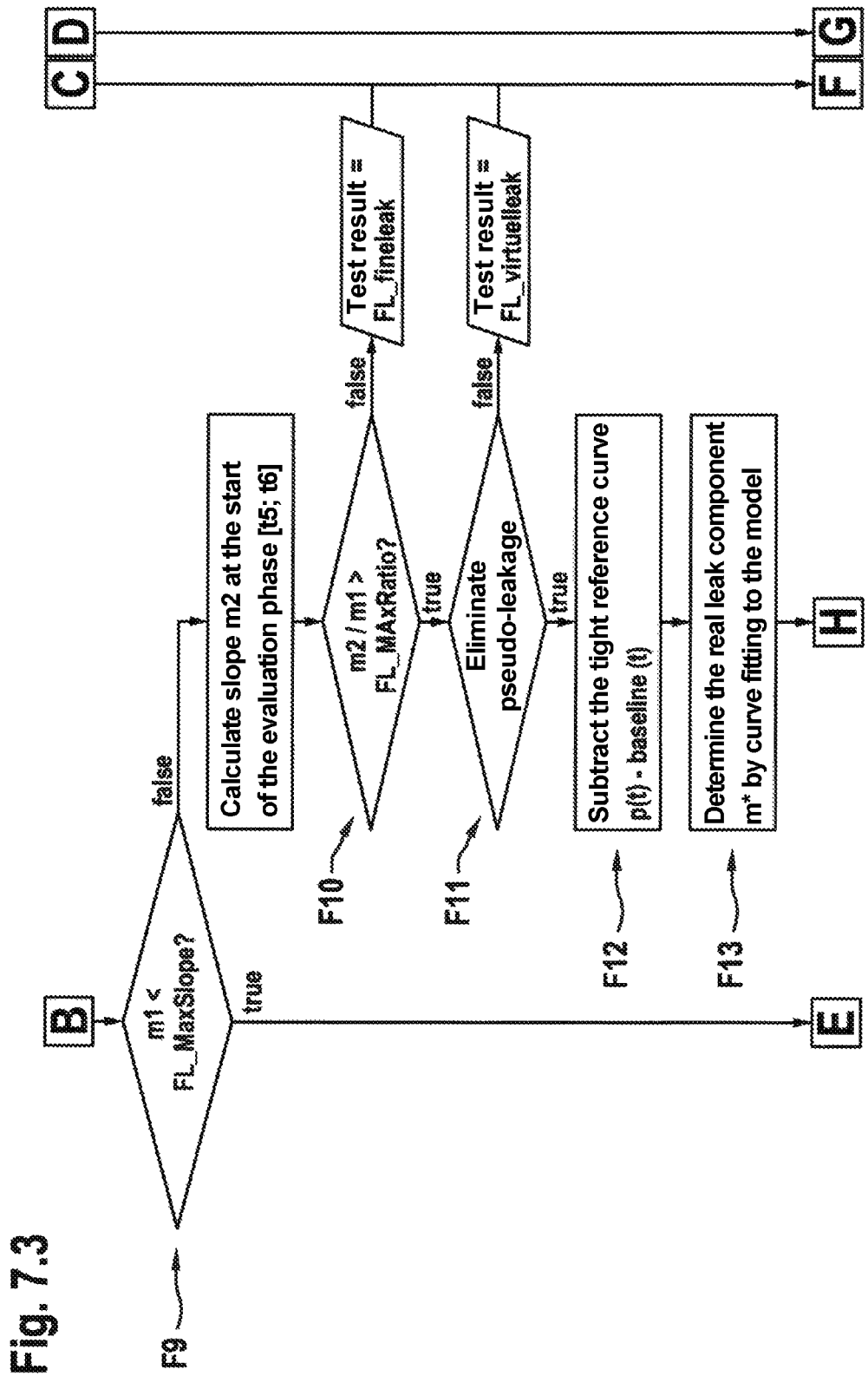
Fig. 7.3

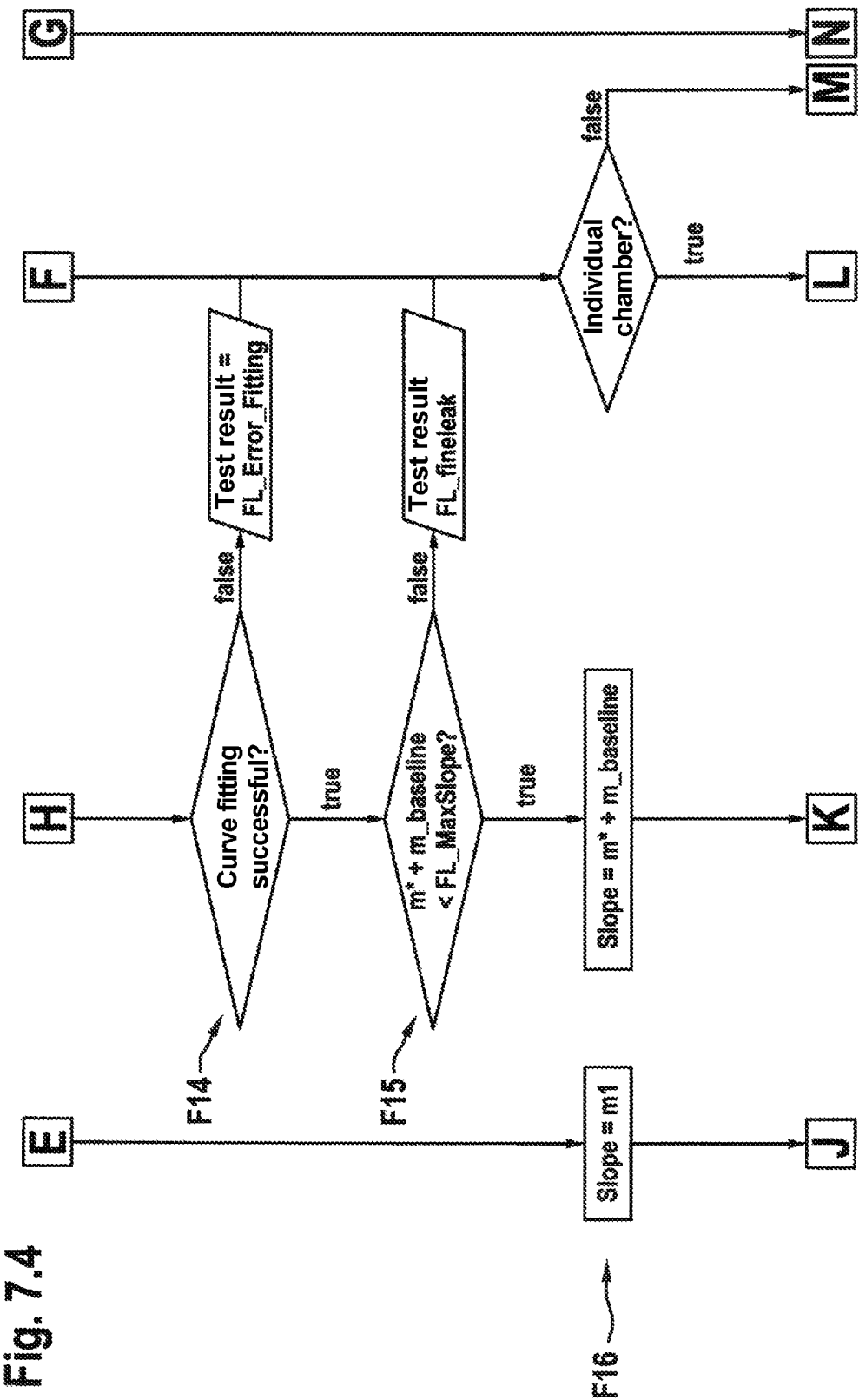
Fig. 7.4

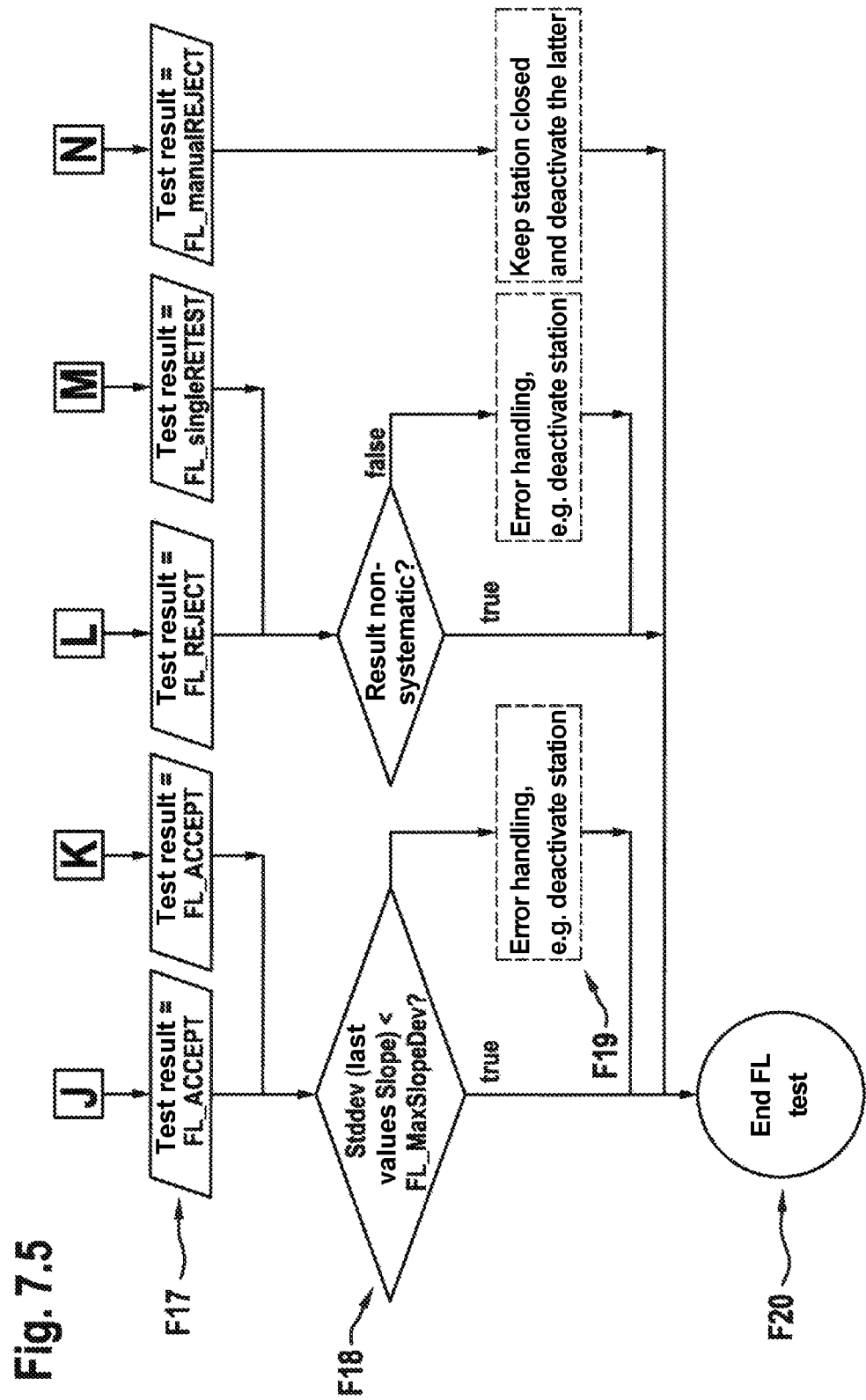
Fig. 7.5

METHOD FOR TESTING A CONTAINER FOR TIGHTNESS

BACKGROUND OF THE INVENTION

The present invention relates to a method for testing a container for tightness. Moreover, the invention relates to a corresponding computer program product.

The method of testing tightness with positive pressure or negative pressure ("vacuum") is applied as a technical method within quality control of pharmaceutical containers in particular and closed containers in general. Particularly within the scope of primary packaging of medicaments, testing tightness by means of a vacuum is a fundamental nondestructive testing method because it is universally applicable.

To this end, a container (vial, ampoule, etc.) that was filled and sealed under atmospheric pressure (or a partial vacuum) is placed in a vacuum in a closed chamber during the testing process; i.e., the space around the container is evacuated and then locked by a valve. Subsequently, a potential pressure change within a certain test time is measured. If the pressure remains constant, this indicates the tightness of the chamber and the inserted container. If the pressure increases during the test time, this indicates a leaky container in the case of a tight test system. The gaseous content (usually air) flows out through leaks such as holes, tears, foreign bodies on the plug, etc., until the pressure between the interior of the container and the vacuum chamber has equalized. In the case of a liquid content, emerging liquid can likewise be detected as a pressure increase if the vacuum in the test chamber lies under the saturation vapor pressure (23 mbar for water at 20° C.) such that the liquid boils.

A similar functionality, which is virtually inverted to the vacuum testing, is the tightness test by means of positive pressure. The advantage herein lies in the greater applicable pressure range. However, a disadvantage consists of the potential risk of leaks (e.g. tears) being sealed by the positive pressure. Moreover, already damaged containers run the increased risk of bursting under the higher pressure difference. Moreover, the method is not suitable for identifying leaks due to liquid (test above saturation vapor pressure and pressure difference from outside to inside).

For this fundamental type of tightness test based on pressure changes, there are a number of patent applications, specialist publications and standards. The above-described procedure is prior art and disclosed.

Currently, the following evaluations are conventional in the case of tightness tests based on a vacuum or positive pressure. Thus, the integral pressure change $\Delta p$ (in Pa) from start to end of the measurement phase with the time duration t, or the pressure increase over time $\Delta p/\Delta t$ (in Pa/s), is evaluated in e.g. the ASTM F2338-09 standard and in the publication Wolf et al., Vacuum Decay Container/Closure Integrity Testing Technology. Part 1. ASTM F2338-09 Precision and Bias Studies. PDA J Pharm Sci Technol 2009, 63, 5, 472-488, and in the tightness testing appliance CETAT-EST515 by CETA Testsysteme GmbH.

The leakage rate Q derived from the pressure measurement is the p·V throughput per unit time of a specific fluid (in this case air) through a leak under certain conditions, usually at a pressure difference of 1013 mbar and a temperature of 20° C. ("helium standard conditions"):

$Q=\Delta(p \cdot V)/\Delta t$ (amount of gas per unit time
    $[Q]$=mbar·l/s)  (Formula 1)

In the tightness test, the essential volume is the residual volume $V_R$, which corresponds to the chamber volume (including possible channels up to the pressure sensor) minus the volume of the test object.

If the leakage rate is expressed as a volumetric flow rate in standard ml/min, the unit is related to normal conditions (DIN 1343: 0° C., 1013 mbar). The reference to a standard reference atmosphere (DIN 1945-1: 20° C., 1 bar, dry air) is also conventional.

A stable measurement state is rendered more difficult by outgassing or temperature effects during the evacuation and by subsequently flowing air from capillaries such as e.g. threads. Such effects are reduced by a stabilization phase between the evacuation of the chamber and the measurement phase.

On account of environmental factors such as humidity, temperature and atmospheric pressure, even the pressure profile of a tight container may vary between a plurality of measurements. Connected therewith are variations of a tightness reference value determined therefrom and of an acceptance criterion (good/bad criterion), which lies at a certain distance above the tightness reference value. For the purposes of compensating such drifts, U.S. Pat. No. 6,202,477 relating to an automated vacuum tightness test has disclosed the method of a "dynamic reference signal". Here, the tightness reference value is formed continuously by averaging the pressure changes of the last n test objects evaluated to be good and the acceptance criterion ("reference signal") is updated. An additional, fixed upper limit prevents variations of the reference signal that are too great.

In addition to the evaluation of the pressure increase ("fine leak test"), the tightness test process usually contains an additional "coarse leak test", carried out beforehand and/or afterward, as disclosed in e.g. U.S. Pat. No. 8,544,315B2. In so doing, the measurement chamber is unified with a second volume (e.g. the rear space of a valve), in which a deviating known pressure level is set. From knowledge of the initial pressures and the equalization pressure after the volume unification, an evaluation is carried out as to whether the container has such a large leak that the interior of the container was already completely evacuated during the evacuation phase and it was no longer possible to identify a fine leak due to lack of pressure difference in relation to the measurement chamber.

The possibility of detecting liquid leaks by means of a pressure increase test is disclosed in U.S. Pat. No. 8,554,315B2 and further patent documents listed therein.

SUMMARY OF THE INVENTION

The method according to the invention allows a test for tightness to be carried out within a short period of time and with high sensitivity and repeatability. In particular, the method can be automated with little outlay. The method according to the invention for testing a container having an interior volume for tightness, comprising the following steps: initially, there is a provision of the container in a pressure chamber. Here, the container within the pressure chamber should be examined in terms of its tightness. If the container is tight, the interior volume of the container is separated from the surroundings of the container. If this is not the case, the container is leaky. In order to identify such leakiness, there is a reduction of pressure within the pressure chamber or an increase of pressure within the pressure chamber as far as a predetermined test pressure. Hence, a pressure difference arises between the interior volume of the container and the surroundings of the container that correspond to the interior of the pressure chamber. The container is leaky should these pressures equalize. Therefore, an ascertainment of a pressure profile within the pressure chamber over time and a comparison of the pressure profile to a reference profile are effectuated. Whether a leak is present in the container is determined in this way. This is the case, in particular, if the pressure profile corresponds to the reference profile and the reference profile corresponds to the pressure profile that occurs in the case of a leaky container. As a consequence, it is possible, in addition to purely determining leakiness, also to make a statement about a degree of the leakiness by virtue of the pressure profile preferably being compared to a multiplicity of different reference profiles. The pressure chamber is preferably a sealed chamber within which any pressure can be set. Should the pressure be set to a constant value, a change in the pressure in the chamber can only be effectuated by a leak in the container. In order to eliminate influences on the pressure profile which are not generated by a leak of the container but which have external influences, provision is made for the ambient conditions of the container and/or the pressure chamber to be monitored and the reference profile to be adapted to changing ambient conditions. The ambient conditions are, particularly advantageously, an ambient temperature and/or an ambient pressure and/or an ambient humidity. Since a change in these parameters may lead to a modified pressure profile, provision is made for also adapting the reference profile to the modified ambient conditions.

This achieves positive and reliable identification of leaks within the container to be tested.

In general, within the scope of this application, provision is made for tightness to be understood to mean that the interior volume of the container is separated from surroundings by the container. Should this not be the case, the container has a leak which allows the passage of a mass flow between surroundings and interior volume.

Preferably, provision is made for adapting the reference profile to be effectuated by ascertaining the pressure profile in the case of at least one reference container with a predefined opening and/or a reference body and by setting the pressure profile as new reference profile. The predefined opening consequently represents a deliberate leak for ascertaining the pressure profile in the case of this deliberate leak. Here, in particular, the pressure profile for such a reference container, which can then be used as a reference profile, is ascertained under the same ambient conditions as the actual testing of the container. Consequently, the reference profile, which corresponds to the test profile of the reference container, and the test profile during the actual testing of the container have the same parameters. This means that both profiles were ascertained under the same ambient conditions. Ascertaining the pressure profile of the reference container is preferably repeated periodically. Moreover, pressure profiles of different reference containers are preferably ascertained in order, as a consequence, to be able to identify and characterize different leaks in the container to be tested. Preferably, provision is moreover made for a regularly ascertained reference profile to be used for self-monitoring of the testing method.

Advantageously, adapting the reference profile is effectuated by calculating a new reference profile from an obsolete reference profile on the basis of a modification of a parameter of the ambient conditions. This means that physical laws are used to calculate how the reference profile changes when there is a change in a parameter which at least partly describes the ambient conditions. Such a parameter can preferably be a temperature, a pressure or a humidity. An obsolete reference profile should be understood to mean that the latter is based on parameters of the ambient conditions which are no longer current.

Particularly advantageously, the new reference profile is calculated from the obsolete reference profile by a point-wise transformation and/or interpolation. This means that individual values of the reference profile which use an obsolete ambient parameter are converted into new values on the basis of an updated ambient parameter. Subsequently, there preferably is an interpolation between the converted points. Alternatively, or additionally, there is a selection from a library with predetermined reference profiles. In particular, a multiplicity of reference profiles, which are valid for a respective combination of different ambient parameters, are stored in this library. If no reference profile should be available for a current ambient parameter, there preferably is an interpolation between reference profiles for known ambient parameters.

Preferably, provision is made for disturbances in the pressure profile to be identified and eliminated or for the affected measurement to be discarded and repeated. To this end, in particular, peaks in the pressure profile are identified and removed from the pressure profile where possible. In particular, such a peak corresponds to a measurement value of the pressure profile which, in comparison with further measurement values, has a dispersion that exceeds a predetermined value. In this way, the quality of the pressure profile can be improved since signal disturbances have no effect, or only a reduced effect, on the method according to the invention.

Advantageously, faulty seals of the pressure chamber will be identified. In particular, this is effectuated by analyzing the pressure profile. To this end, steps in the pressure profile are ascertained and/or there is an identification of slopes of a plurality of ascertained pressure profiles having a dispersion which exceeds a predetermined value. A step in the pressure profile, in particular, allows identification of a non-ideal interaction between O-ring seal and associated groove, meaning that there is no immediate complete sealing effect. By identifying faulty seals, it is possible, in particular, to output a warning signal that the identification of leakiness of the container may be faulty since the seal of the pressure chamber is possibly defective.

Moreover, provision is made in a further preferred embodiment for liquid leaks to be recognized and identified as such. In particular, a liquid leak is identified by virtue of the pressure profile initially exhibiting a strongly increasing curve, which asymptotically converges to a saturation vapor pressure, known in advance, of the liquid. To this end, provision is made for the predefined test pressure to lie below the saturation vapor pressure known in advance. By way of such a characteristic profile, it is possible to distinguish between air leaks and liquid leaks. If a plurality of different leaks are present, particularly a liquid leak and an air leak, the pressure profile exhibits a corresponding superposition of the characteristic profiles for the different leaks. In particular, the curve of the liquid leak with asymptotic convergence is superposed on a linear curve of the air leak. The superposed individual partial curves of the pressure profile can be extracted easily and with little outlay from the pressure profile. Preferably, the pressure profile exceeding a threshold at the start of the fine leak test is a first criterion to reject the container to be tested as leaky on account of a liquid leak or a large air fine leak.

Preferably, only linear portions of the pressure profile are taken into account in the step of comparison with one or more reference profiles. Since the small air leaks to be identified in this step, in particular in the single-digit micrometer range, lead to a linear pressure profile during the test time with a negligible effect on the pressure difference between container interior and pressure chamber, this ensures that only relevant sections of the pressure profile are used for identifying leakiness. Since the other regions of the pressure profile do not signal leakiness, a comparison with the reference profile which has a characterization of the leakiness as a content can be avoided in these regions. Consequently, the method can be carried out in a fast and resources-sparing manner.

Preferably, a differential pressure curve between a reference line and a measurement branch connected to the pressure chamber is determined by way of a differential pressure sensor. Here, both the measurement branch and the reference line are blocked by way of a measurement valve in order to undertake a fine measurement of the pressure profile. The measurement valve is preferably a double valve. The reference line is preferably only provided for connecting the differential pressure sensor and the measurement valve such that there is a reference for the pressure within the pressure chamber. A start of the fine measurement is assumed as such a point within the differential pressure curve at which the differential pressure curve and/or a slope of the differential pressure curve has a discontinuity. If there is pressure equilibrium in the pressure chamber and in the reference line before the measurement valve is closed, the pressure increases in the pressure chamber after the measurement valve is closed. In practice, this also occurs in the case of completely sealed containers within the pressure chamber, for example on account of residual leakiness of the pressure chamber. The onset of the increase is consequently an indication for a completely closed measurement valve and, as a result, for the start of the fine measurement. If a residual gas amount is left in the reference line or in the pressure chamber, there is a compression or relaxation when the valve of the measurement valve is closed, which is identifiable from a discontinuity in the differential pressure profile. As a consequence, it is possible to identify the time at which the valve of the measurement valve is completely closed in a simple manner and with little outlay, but also positively and reliably at the same time, and hence it is possible to accurately determine the start of the fine measurement.

The invention moreover relates to a computer program product having program code stored on a machine-readable storage medium. The program code serves to carry out the method as described above when the computer program product is executed on a computing apparatus. In particular, the computing apparatus can be a computer and/or a controller.

In conclusion, the invention allows a fully automatic pressure increase test with cycle times of a few seconds with, at the same time, a high sensitivity and reproducibility over a time period of several hours. In order to meet these requirements, the advantageous properties set forth below emerge.

Identification and Computational Compensation of Pseudo-Leakage from Virtual Leaks If a pressure increase is measured in the tightness test on a vacuum basis, this does not necessarily indicate a leaky test object, i.e. a leakage flow from the interior of the container.

Pseudo-leakage from virtual leaks, i.e. pressure increases which occur in a real measurement system, such as residual leakiness, subsequent flow from threads, settlement movements of seals and reactions to humidity (reception in an open chamber and subsequent outgassing under a vacuum), can be superposed on the actual measurement signal and appear as a leak. Such effects can be minimized by structural measures and/or by subtracting a tight reference profile (pressure curve for a tight reference body, in particular a tight reference container, in a tight test chamber).

Moreover, the present invention preferably facilitates the identification and computational compensation of pseudo-leakage which emanates from the test objects themselves.

Such effects may emanate, in particular, from cavities on the outside of the containers, from which the air (at atmospheric pressure) does not completely escape during the evacuation phase. By way of example, vials have air inclusions behind the flanged cap (see FIG. 1). Through gaps, the air still creeps into the test chamber during the measurement phase and leads to a pressure increase there. Here, the assumption must be made that vials from the same production batch exhibit differently sized virtual leaks, i.e. the effect must be considered individually for each vial.

Dynamic Generation of the Acceptance Criterion

In the ideal case, the pressure curve of a tight reference body in a tight pressure chamber is a constant signal (corresponding to the pressure in the test chamber in the case of an absolute/relative pressure measurement; ideally $\Delta p=0$ Pa in the case of the differential pressure measurement).

In practice, the profile of pressure curves depends on ambient conditions such as temperature (T), atmospheric pressure ($p_{atm}$) and humidity (rH). T and rH, in particular, have an effect on the outgassing behavior of the measurement system and, possibly, the containers to be tested, e.g. the plastic or paper components thereof, as well, even if the measurement system has already been optimized structurally in respect of a low outgassing behavior under vacuum conditions.

If, as described in e.g. U.S. Pat. No. 6,202,477, the tightness reference value and hence the acceptance criterion is continuously formed from the trend of the last containers tested to be tight, there is the risk of systematically occurring trends falsifying the evaluation; for example, there is the risk that containers with continuously increasing leakage shift the acceptance criterion ever further upward. Therefore, such a method is only applicable within a tightly delimited framework. The present invention indicates a more universally applicable method.

Reduction in the False Reject Rate

Further effects which may lead to a negative test result but are not caused by a leaky test object include broken seals, in particular the dynamically greatly burdened chamber seal, and (electronic) signal disturbances. The pressure curves should be specifically analyzed for these, in order to treat such effects separately. If the measurement valve switches with undefined delays, the pressure curves should be aligned to a temporal reference point prior to the evaluation on the basis of characteristic features in the curve.

Predictive Maintenance

Going beyond the improvement in the test quality, it is possible to evaluate the functionality of the process valves (and their pilot valves) on the basis of features. In addition to the aforementioned evaluation of the chamber seal, dedicated service measures should be proposed therefrom ("predictive maintenance").

BRIEF DESCRIPTION OF THE DRAWINGS

Exemplary embodiments of the invention will be described in detail below with reference to the attached drawing. In the drawing.

DETAILED DESCRIPTION

The embodiment described below is directed to, in particular, the pressure increase test (testing tightness in a vacuum) for identifying leaks. Equally, the explanations below, in principle, can be applied—with an inverted sign—to tightness tests on a positive pressure basis.

Overview of a Preferred Embodiment of the Invention

Figure 1:
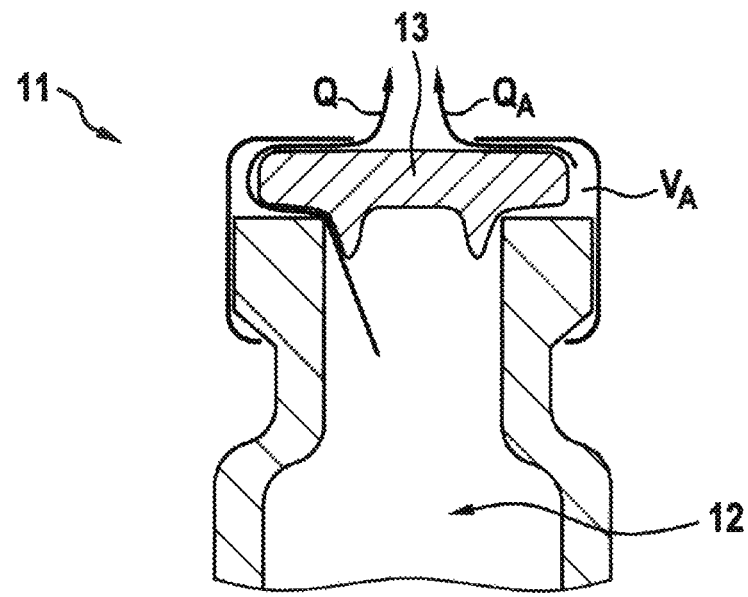
FIG. 1 is a schematic view of a container, the tightness of which is tested using a method according to an exemplary embodiment of the invention.

FIG. 1 schematically shows a container 11 having an interior volume 12. The interior volume 12 is delimited from surroundings by the container 11, which has been provided with a lid 13. However, the container 11 may have leaks which can lead to leakage. This is indicated schematically in FIG. 1 by a first volumetric flow rate Q and a second volumetric flow rate $Q_A$.

The first volumetric flow rate Q is a volumetric flow rate from the interior volume 12 to the surroundings. Consequently, the container 11 has a leak. By contrast, the second volumetric flow rate $Q_A$ is a volumetric flow rate from a volume $V_A$ of the container 11 which does not correspond to the interior volume 12. In particular, this is a volume within the lid 13. Consequently, the second volumetric flow rate $Q_A$ does not indicate a leak of the container 11 and it should be distinguished from the first volumetric flow rate Q. Therefore, the assumption is made below that the first volumetric flow rate Q indicates a leak and the second volumetric flow rate $Q_A$ indicates a virtual leak.

Figure 2:
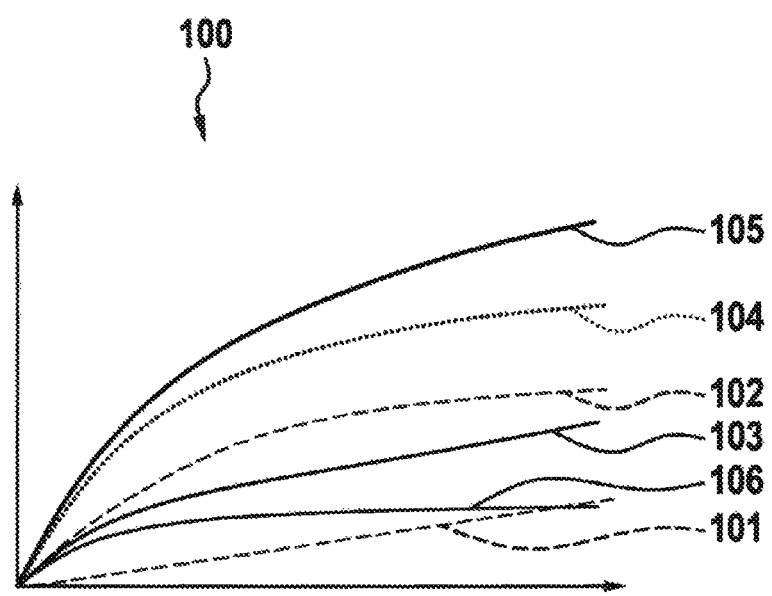
FIG. 2 is a schematic view of a multiplicity of different test pressure profiles, as may occur when carrying out the method according to the exemplary embodiment of the invention.

Identification and Computational Compensation of Pseudo-Leakage from Virtual Leaks FIG. 2 shows the pressure curves for a tight container, a real leak and a virtual leak and the superpositions thereof. For leaks that should conventionally be detected in the micrometer range and for interior volumes 12 in the milliliter range, a real leak leads to a linear pressure increase during the observed first seconds. If, like in the case of the flange, the outer cavities are small in relation to the interior volume 12 of the container and if the gap width is large in relation to the real leak to be detected, the curved pressure profile of the virtual leak can be separated from the measured overall pressure increase by way of a physical model indicated in Formula 3. Hence, the stabilization time, otherwise required, for suctioning the external cavities empty becomes obsolete.

FIG. 2 shows a multiplicity of different test pressure profiles 100. A normal test pressure profile 106 sets in if no leak is present, while a first leak profile 101 shows a pressure profile in the case of a real leak and a second leak profile 102 shows a pressure profile in the case of a virtual leak. Moreover, various test pressure profiles 103, 104, 105 are shown. The first test pressure profile 103 sets in if the container 11 has a real leak. In particular, this curve is a superposition of the normal test pressure profile 106 and the first leak profile 101. The second test pressure profile 104 sets in if the container 11 has a virtual leak. In particular, this curve is a superposition of the normal test pressure profile 106 and the second leak profile 102. Finally, the third test pressure profile 105 sets in if the container 11 has a virtual leak and a real leak. Consequently, this curve is, in particular, a superposition of the normal test pressure profile 106, the first leak profile 101 and the second leak profile 102. In the shown diagram, the ordinate axis represents a pressure axis and the abscissa axis represents a time axis.

The advantage of the method according to the exemplary embodiment lies in a greater selectivity between tight and leaky containers with, at the same time, short cycle times.

The proposed evaluation method can be applied both to individual containers and, in the case of an appropriate extension of the model, to the test of container groups (a plurality of containers in the same measurement chamber).

Dynamic Generation of a Reference Profile

The acceptance criterion for the good/bad evaluation is expediently predetermined in relation to defined conditions, for example expressed as a maximum acceptable leakage rate in standard ml/min or as an equivalent diameter of an ideal hole. The corresponding pressure profile—the reference profile 200 (see FIG. 3)—or an acceptance value derived therefrom (e.g. slope in Pa/s within a defined interval) is preferably produced by measuring a reference container with a defined leakage rate (for example configured as an empty product container with an inserted calibrated orifice).

Figure 4:
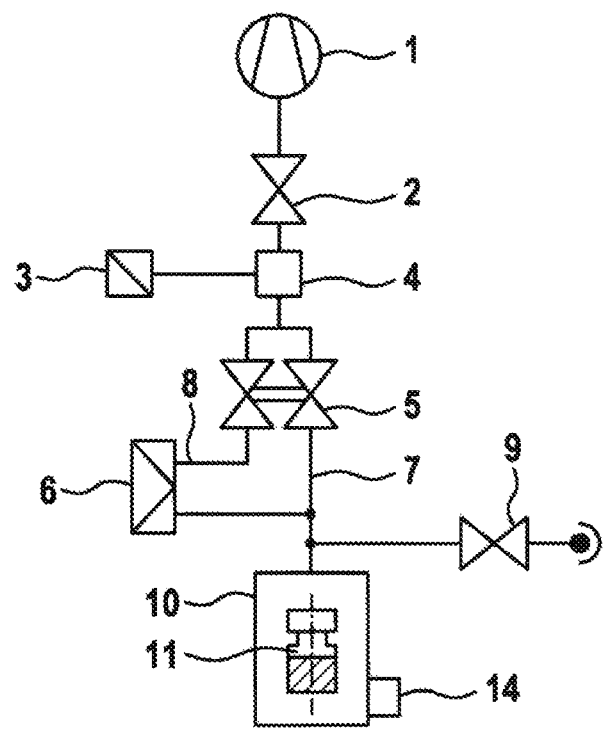
FIG. 4 is a schematic view of a measurement apparatus for carrying out the method according to the exemplary embodiment of the invention.

The specified ambient conditions are preferably captured by way of appropriate sensors 14 (see FIG. 4). If at least one threshold is exceeded, such as, in particular, the change in temperature since the last re-examination s_ΔT>1K, a new generation of the reference profile is triggered. Alternatively, or additionally, the trigger is effectuated if the mean of the last n measurements exceeds a threshold s_m that lies below the acceptance criterion.

In a known apparatus, gaps can automatically be introduced into the supply in a wanted and programmable manner, said gaps then being equipped with reference containers ("re-examination containers" in that case). If no automatic supply is available, the test machine can alternatively request a certain reference container within a predetermined time interval for manual placement into the supply (e.g. on the rotary table) and said reference container can be identified by way of an appropriate apparatus such as e.g. a barcode or RFID reader.

Figure 3:
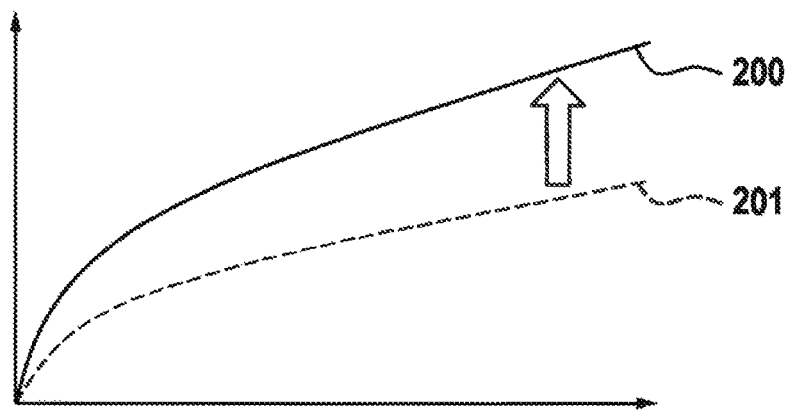
FIG. 3 is a schematic view of an adaptation of a reference profile during the method according to the exemplary embodiment of the invention.

An alternative to the use of reference containers, or as a complement in the case of a selection of long time intervals between reference measurements, the reference profile 201, or the evaluation variables derived therefrom, can be transformed to the current ambient conditions by way of physical relationships, as shown schematically in FIG. 3. In principle, the transformed reference profile 200, which is obtained by means of one or more defined reference containers and/or according to known physical relationships, or the evaluation variables derived therefrom should be preferred to a reference signal that is based on measurements of the test objects themselves (like in U.S. Pat. No. 6,202,477).

FIG. 3 shows a reference profile 200 which is calculated from a reference profile 201 that was used in preceding measurements. In the shown diagram, the ordinate axis represents a pressure axis and the abscissa axis represents a time axis.

The advantage of the methods, described below, for dynamically generating the reference profiles 200 lies in the increase of the reproducibility, in particular during long-term operation, in the case of varying ambient conditions and in a shorter running-up time of the test machine (when an equilibrium sets in between the changing exposure of the chamber to the surroundings and vacuum).

Moreover, identifying virtual leaks requires the pressure curve that is to be fitted to a physical model to be cleaned to such an extent that the latter only depends on real and virtual leaks. Therefore, the tight reference profile must be subtracted from the measurement curve in advance.

Identifying Disturbances in the Pressure Signal

A noisy pressure signal and hence a noisy test pressure profile 100 generally leads to a greater dispersion of the slope values calculated from the curve (e.g. by way of regression) and reduces the sensitivity of the test. Especially non-uniform noise and outliers like in FIG. 10 may moreover falsify the calculated pressure increase. In particular, a downward outlier would simulate a lower pressure increase or a lower leakage rate, which could lead to a false positive test result. Conversely, an upward outlier could lead to a false negative result. Therefore, signal disturbances should be identified prior to the evaluation and the test should be terminated with a result of non-inspected. In the case of multiple occurrences in a test machine, the relevant test unit should be deactivated automatically. If the fault occurs in a plurality of test units in a test machine (sequence error or added-up error), this is an indication for a global disturbance source and should lead to the machine being stopped.

Identifying Faulty Seals

The valves may have an operating duration of several million strokes and they are preferably protected from the surroundings by means of filters. By contrast, greater wear and a higher risk of contamination should be expected at the exposed chamber seal (e.g. abrasion of the seal, foreign particles). Such a defective seal can be specifically identified during the running machine operation by way of suitable evaluations of the pressure curve of the test pressure profile 100 and false measurements can be avoided. Moreover, a change of the seal can be recommended in good time, still before the effect influences the test result.

Determining the Start Time of the Fine Measurement

For the best-possible reproducible evaluation of the pressure-time signal, the start point of the evaluation is determined from a characteristic reaction of the pressure signal to one or more valve switches. Switching of a process valve is triggered in the preferred use of a pneumatic valve by way of an electrically actuated pilot valve or it is directly electrically actuated in the case of an electrically operated valve. Preferably, the actuation is effectuated by a real-time system; otherwise, the reactions to the switch in the pressure signal (actual time) may already deviate from the intended time due to the control electronics. In principle, differences between the actual and intended time may occur over the entire actuation and measuring distance, in particular as a result of delays of the process or pilot valve (e.g. fatigued return spring).

Figure 12:
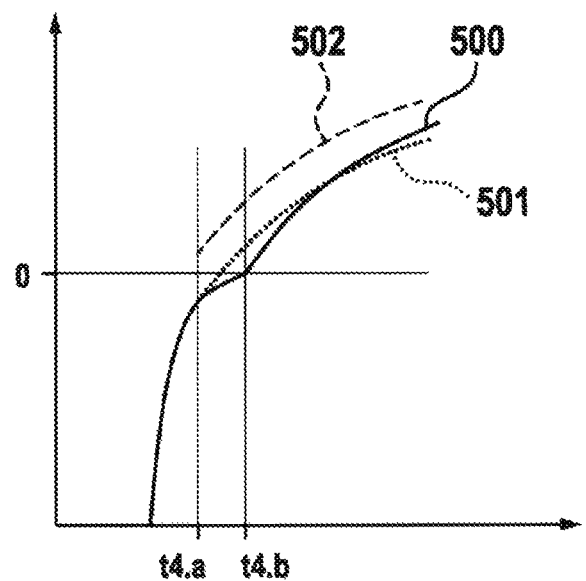
FIG. 12 is a schematic view of an identification of a start point of a measurement during the method according to the exemplary embodiment of the invention.

If use is made of a differential pressure sensor 6 (cf. FIG. 4), the pressure chamber 10 (cf. FIG. 4) along with the measurement branch 7 (cf. FIG. 4) and the reference branch 8 (cf. FIG. 4) are preferably evacuated before the fine measurement until pressure equilibrium prevails on both sides of the differential pressure sensor 6, i.e. until a constant pressure signal sets in (FIG. 12; valve closure at t4.*b*). Likewise, the fine measurement can be started early from a differential pressure level that still is elevated or reduced (FIG. 12; valve closure at t4.*a*), provided that the initial level is reproducible and the remaining usable measurement range is sufficient for evaluating the tightness.

Predictive Maintenance of the Valves

Wear can be deduced in good time from the switching times of the valves and the reaction in the test pressure profile (e.g. time difference, slopes deviating from reference values); consequently, maintenance measures can be proposed and outage times can be reduced.

The deviation of the actual switching times ascertained from the measurement data from the intended switching points, or statistical variables based thereon (e.g. sliding mean values, standard deviations), of many cycles is used as an indicator for wear/fatigue of the valves and/or the pilot valves. By way of example, the measurement system can indicate the expected remaining valve service life on the basis of empirical values from load tests or it may recommend the servicing of a valve if a threshold is exceeded.

Systematically occurring leaky results (REJECT) in a test unit may moreover be used as an indicator for a leaky measurement system. Whether the cause lies in the chamber seal or the valves can be effectuated by way of a separate system test.

DETAILED DESCRIPTION OF THE EMBODIMENT OF THE INVENTION

1 Measurement Setup

FIG. 4 shows an exemplary measurement apparatus having the following constituent parts: vacuum source 1, vacuum valve 2, absolute or relative pressure sensor 3, rear space of the valve 4, measurement valve 5, in particular as a double valve with two mechanically coupled seats, differential pressure sensor 6, measurement branch 7, reference branch 8, ventilation valve 9, pressure chamber 10, container 11 to be tested. The measurement valve 5 could also be embodied as two separate valves.

2 Overall Course of the Test Cycle

Figure 5:
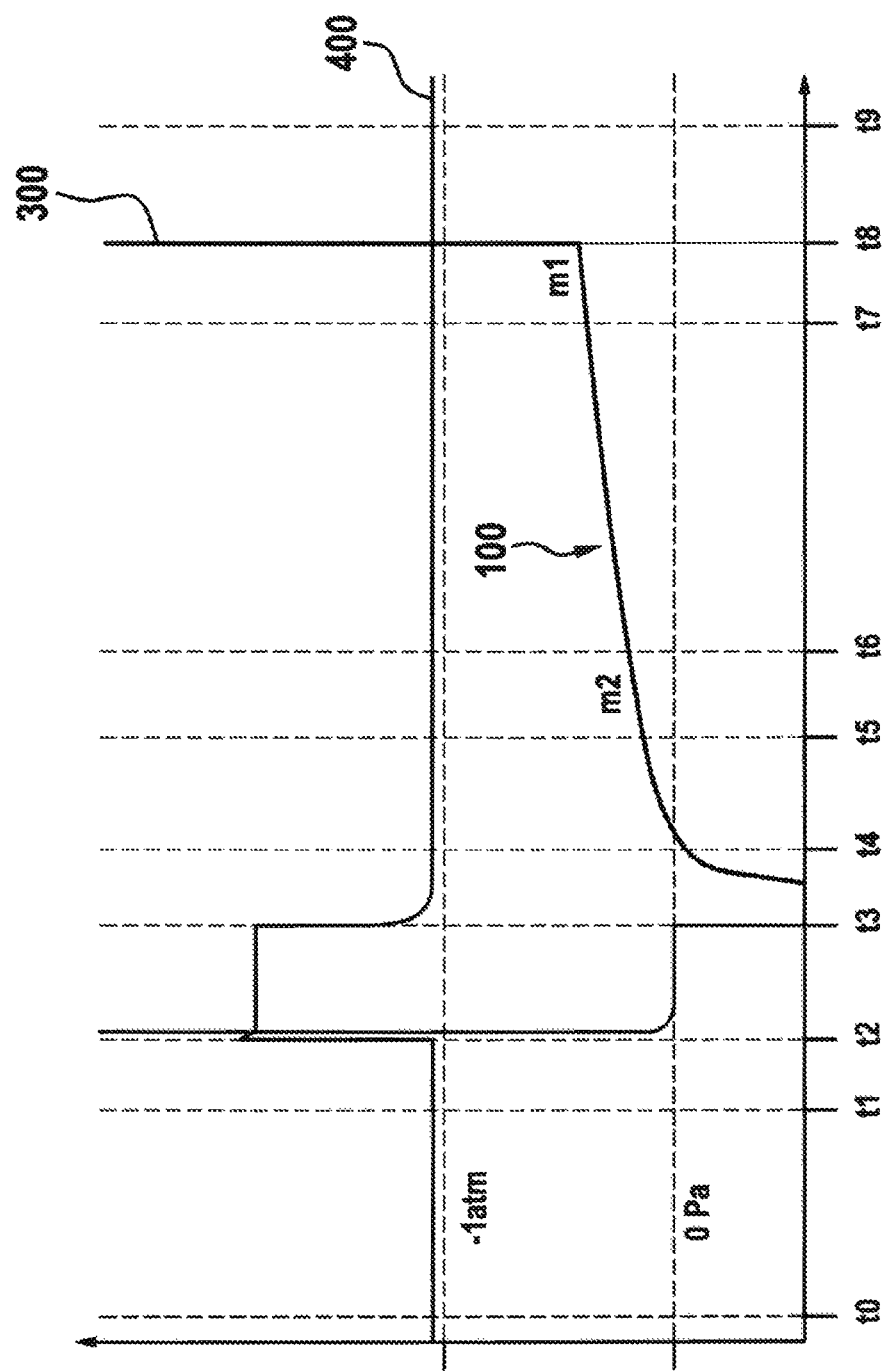
FIG. 5 is a schematic view of different pressure profiles during the method according to the exemplary embodiment of the invention, FIGS. 6.1-6.4 are a first schematic flowchart of the method according to the exemplary embodiment of the invention, FIGS. 7.1-7.5 are a second schematic flowchart of the method according to the exemplary embodiment of the invention.

The course of an exemplary test cycle is indicated in FIG. 5. For the exemplary embodiment of the present invention, the differential pressure-time curve 300, in particular, is of importance, the latter being ascertained by the differential pressure sensor 6. Moreover, a relative pressure-time curve 400 is shown, the latter being ascertained by means of the relative pressure sensor 3. In the shown diagram, the ordinate axis represents a pressure axis and the abscissa axis represents a time axis.

The test begins at a time t0 with a closed, aerated chamber 10 and an evacuated rear space of the valve 4. At t1, the vacuum valve 2 and the ventilation valve 9 are closed. At t2, the measurement valve 5 is opened. The signal of the absolute or relative pressure sensor 3 is evaluated between t2 and t3 in order to carry out a coarse leak test. At t3, the vacuum valve 2 is opened and hence the measurement branch 7, the measurement chamber 10, and the reference branch 8 and the rear space of the valve 4 are evacuated. At t4, the measurement valve 5 is closed, the latter preferably being configured as a double valve and simultaneously closing the reference branch 8. The differential pressure sensor 6 now indicates the pressure increase in the measurement chamber 10 in relation to the reference branch 8. The signal is not evaluated in a brief period of time between t4 and t5; this is, in particular, a stabilization phase. At t5, there preferably is a first evaluation as to whether the pressure exceeds a threshold FL_ThMax. This would indicate a large fine leak which, however, is smaller than a coarse leak to be determined during the coarse leak test or a liquid leak. Between t7 and t8, at the end of the fine leak phase, the slope m1 of the differential pressure-time signal 300, which represents the test pressure profile between t3 and t8, is calculated as an evaluation variable for the tightness. A small quotient of m1 and a slope m2, calculated at the start between t5 and t6, is an indication of a virtual leak. At t8, the ventilation valve 9 is opened and hence the measurement chamber 10 and the measurement branch 7 are aerated.

3 Program Sequence for Generating the Reference Profiles

An exemplary embodiment for generating the reference profiles 200 for a tight reference container and a leaky reference container is shown in FIG. 6 for an individual chamber. In process step (PS) R2, the deviations of the ambient conditions and the mean value of the last containers 11 tested as tight are ascertained. In PS R3, there is the comparison with thresholds which triggers the generation of new reference profiles 200 if exceeded and otherwise triggers the normal product test (PS R4).

Initially, the tight reference profile 106, as baseline(t), and the slope m_baseline are determined in the evaluation range [t7; t8] for a tight reference container (PS R5 to PS R10). Subsequently, a reference container with the maximum permissible leakage rate is requested and the slope FL_maxSlope is determined from the pressure profile thereof in [t7; t8] (PS R11 to PS R15).

Before a fine leak evaluation, the initial variables baseline (t), m_baseline and FL_maxSlope are still optionally scaled for a different chamber type, such as, in particular, a group chamber, or for other occupancies, such as, in particular, in the case of a reference measurement with only one container in a dual chamber, for a product test with full occupancy.

Moreover, the functionality of the test system is monitored by means of the reference measurements. If the slope m_baseline exceeds a threshold s_baseSlope (PS R8) or if the slope FL_maxSlope is not between s_LowAcc and s_HighAcc (PS R14), corresponding alarms are output.

4 Program Flowchart of the Fine Leak Evaluation

The preferred exemplary embodiment of a program flowchart for evaluating the fine leak phase for a machine with individual chambers and group chambers is shown in FIG. 7.

The input parameters differ according to chamber type. By way of example, the maximum accepted slope FL_MaxSlope for the individual chamber is initialized with a higher value than for a group chamber on account of the smaller residual volume $V_R$, with both values corresponding to the same maximum accepted leakage rate (in this respect, see also 6.1b)).

The temporal adjustment of the curve (process step PS F3) is described in more detail in point 9, checking of the signal quality (PS F4) in 7 and the continuity of the pressure increase (PS F5) in 8.1.

For the purposes of indicating a liquid leak (PS F8) on the basis of the saturation vapor pressure by means of a lower threshold VSP min and an upper threshold VSP max, see 11. In this case, the chamber is aerated after the test (cutting the pressure difference above the leak), but it remains closed pending a manual removal (Status FL_manualREJECT) in order to prevent contamination outside of the chamber. The affected test station is deactivated for further test cycles.

In the case of a bearable risk of contamination, it alternatively would be possible (not drawn here) to continue to use the test station, possibly after automatic measures for drying purposes (such as e.g. continued evacuating or purging), and the tested container or containers could be removed like in the case of an air leak.

The elimination of virtual leakage (optionally connectable with PS F11) is treated by PS F12 to PS F15. In order to ensure that only virtual leakage is in fact removed by calculation, the value FL_MaxRatio should be selected in such a way in this case that m2/m1<FL_MaxRatio always applies for (internally and externally) tight reference containers—the pressure-time signal of which in a real measurement system likewise deviates from the ideal linear profile.

For individual and group chambers, the result of a passed fine leak test is FL_ACCEPT. The result for a failed test in an individual chamber is FL_REJECT, i.e. the container tested to be leaky is sorted into a corresponding reject path. In the case of a group chamber, the result is FL_singleRETEST, i.e. the containers are fed to subsequent individual re-examinations (after a sufficiently long waiting time for equalizing the internal pressure to atmospheric pressure in the case of a leak).

If the result FL_REJECT or FL_singleRETEST occurs systematically (PS F18), for example three times in succession for the same test station or, overall, three times more frequently than for the other test units, the faulty station is automatically deactivated for further test cycles after discharging the test object. If there was a significant dispersion of the last slopes measured with this test station despite a result of FL_ACCEPT, this likewise indicates a faulty station, in particular a faulty seal thereof (see 8.2).

5 Eliminating Virtual Leaks

Ideally, after subtraction of the tight reference profile, the pressure-time measurement curve is free from virtual leaks originating from residual leakiness of the measurement system or outgassing (it is also possible to take account of potential—reproducible—outgassing effects of the test objects in the case of a suitable selection of the tight reference container, for example likewise equipping the latter with a paper label). In the case of an empty pressure chamber 10 or in the case of one or more inserted tight containers, the cleaned pressure-time signal is ideally constantly zero.

Assumptions:

the real (air) leak with the leakage rate Q causes a linear pressure profile $p_K(t)$ in the pressure chamber 10 (due to a negligible effect on the internal pressure and chamber pressure, $Q(0)=Q(t)$ during the considered time interval)

this also applies if a plurality of containers are leaky in a group test. In the case of three containers, this can be combined to an overall leakage rate $Q=Q_1+Q_2+Q_3$.

externally enclosed air with an opening to the outside but not to the inside into the container 11 (e.g. behind the flanged cap) causes an exponential profile as a virtual leak since the pressure in the substantially smaller cavity volume $V_A$ reduces significantly. The decreasing pressure difference across the opening in turn causes a reducing flow rate.

The pressure profile $p_K(t)$ in the measurement chamber can be represented as follows:

$$p_K(t) = \underbrace{\frac{1}{V_R}Q(0)\cdot t}_{\text{real leak}} + \underbrace{\left(\frac{V_A \cdot p_{atm}}{V_A + V_R}\right) \cdot \left(1-\exp\left(-\frac{Q_A(0)}{V_A \cdot p_{atm}}t\right)\right)}_{\text{virtual leak 1 \quad\quad virtual leak 2}} + \ldots \quad \text{(Formula 2)}$$

with time t, the known residual volume $V_R$, the unknown real leakage rate $Q(0)$ to be detected, flowing out of the container interior, the unknown volume of the external cavity $V_A$, the unknown virtual leakage rate from the cavity at the start of the measurement $Q_A(0)$ and the known atmospheric pressure $p_{atm}$.

Formula 2 describes the simplified case where the pressures behind the virtual and real leak at t=0 correspond to the atmospheric pressure and the chamber pressure corresponds to 0 mbar (extensions without these simplifications are likewise representable).

The corresponding time derivative applies for the pressure increase:

$$p'_k(t) = \underbrace{\frac{1}{V_R}Q(0)}_{\text{real leak}} + \underbrace{\left(\frac{Q_A(0)}{V_A+V_R}\right)\cdot \exp\left(-\frac{Q_A(0)}{V_A\cdot p_{atm}}t\right)}_{\text{virtual leak 1 \quad\quad virtual leak 2}} + \ldots \quad \text{(Formula 3)}$$

For a long time t, the contribution of small volumes disappears (the exponential term tends to zero), which forms a justification for the relatively long stabilization time that is usually employed.

Figure 8:
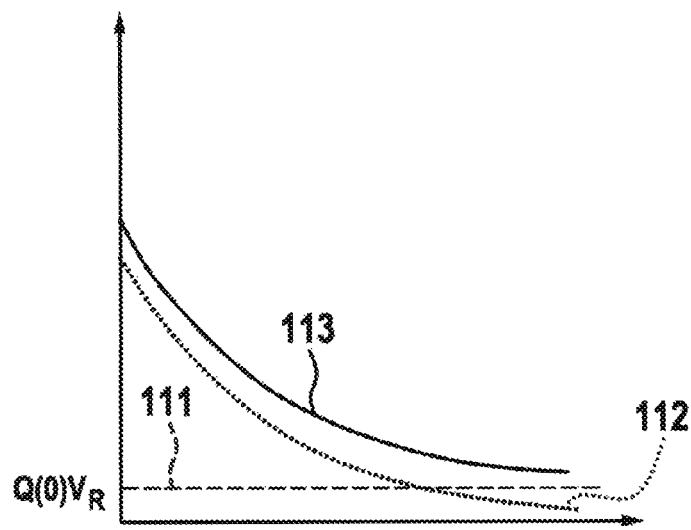
FIG. 8 is a schematic view of a curve of the derivative of the test pressure profile during the method according to the exemplary embodiment of the invention.

If the container 11 is exposed to the vacuum for only a short period of time t, the constant leakage rate $Q(0)$, which is inversely proportional to $V_R$, can be extracted from the exponential term (or plurality of exponential terms in the case of the group test) (see FIG. 8). In the diagram shown in FIG. 8, the ordinate axis represents a time derivative of the pressure and the abscissa axis represents a time axis. A first derivative curve 111 shows the profile in the case of a real leak, a second derivative curve 112 shows the profile in the case of a virtual leak and a third derivative curve 113 shows a combination of virtual leak and real leak.

Since $V_R$ is known and only $Q(0)$ is relevant to the tightness evaluation, a multiparameter fit to a function of the form $$a+b\cdot\exp(-c\cdot t)$$

with $Q(0)=a\cdot V_R$ \quad\quad (Formula 4)

is suitable.

The Levenberg-Marquardt algorithm (LMA), applied to Formula 5 and the partial derivatives thereof with respect to b and c, is suitable for the parameter fit. The simplex method is another option for the parameter fit.

6 Dynamic Generation of the Reference Profiles

The reference profiles (or corresponding reference values) can be dynamically generated using various methods, on the basis of measurements and assisted in part by computation.

6.1 Dynamic Reference Measurement

Recording new reference profiles 200 on the basis of suppliable reference containers can be triggered by one or more of the following events (R2 to R3 in FIG. 6):

A significant deviation of the ambient conditions in relation to the last reference measurement A significant deviation of the mean pressure increase or the corresponding leakage rate of the last n product containers evaluated as tight in comparison with the last tight reference value Independently thereof, a preferably time-controlled reference measurement, particularly preferably an additional time-controlled reference measurement, is carried out. After recording a new reference profile with a reference container, there optionally can be by means of at least one further reference container a verification of the new reference measurement or of the new acceptance criterion derived therefrom.

For the purposes of generating the reference profiles of an individual or group chamber, the following variants are suitable, particularly in a test running in an automated manner:

a) A tight reference profile from the measurement of the empty chamber (i.e. format parts with a known empty volume $V_{empty}$).

The multiplication of the pressure profile by the ratio of the volume of the empty chamber to the residual volume of the chamber $V_{empty}/V_R$ yields the tight reference profile for a filled pressure chamber 10.

Advantage: no tight reference containers necessary disadvantage: lower sensitivity, as $V_{empty} > V_R$ b) Reference measurement using chambers with one or more inserted reference containers.

If the pressure chamber 10 is not completely filled, e.g. a singly occupied dual chamber, multiplying the pressure curve by $V_{R(1)}/V_{R(2)}$ yields the reference curve for a completely filled chamber.

Advantage: higher sensitivity than in (a) due to a smaller $V_R$, the same conditions as in the test of the containers 11 in the case of the completely filled pressure chamber 10. Precondition: possibility of supplying the reference containers c) Reference measurement using a certain reference chamber with an inserted reference container.

In a test system consisting of a plurality of units, for example arranged on a carousel, the assumption can be made that changing ambient parameters have the same effect on all chambers, possibly linked by way of a correction function (e.g. relating to different outgassing behavior on account of differently large surfaces of the individual chamber and dual chamber). Then, the reference profiles can be determined for only one of the chambers and transferred to the other chambers. In the case of a test machine with a plurality of test units, e.g. 4×(8 group chambers+1 individual chamber), one or more individual chambers are preferably used for the reference measurements (on account of a smaller $V_R$ and equipping/forming a gap being simpler).

Advantage: reference measurements are only carried out for one or a few pressure chambers 10. Therefore, reference profiles 200 can be produced more frequently and very close to the current ambient conditions. The reference profiles 200 need not be transformed to new ambient conditions by calculation.

Precondition: possibility of supplying the reference containers

Preferably, the reference containers have the same (external) volume as the containers 11 to be tested and they are preferably free from virtual leaks. If the container 11 is a vial, the reference container can be configured as the same vial with a rigid lid with or without an orifice or a different opening with a known leakage rate.

6.2 Point-Wise Transformation of a Standard Reference Curve

Figure 9:
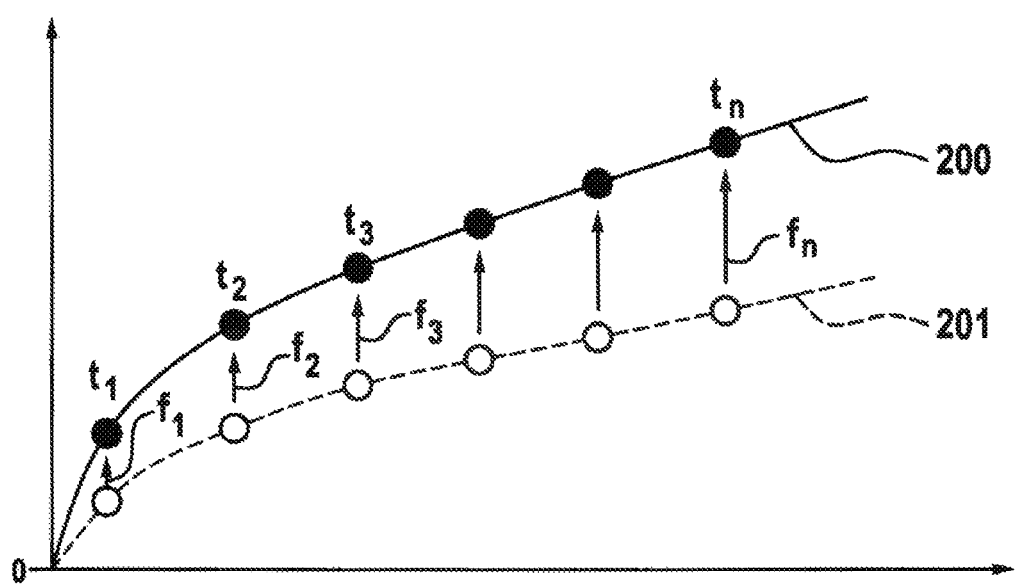
FIG. 9 is a schematic view of a point-wise adaptation of the reference profile during the method according to the exemplary embodiment of the invention.

FIG. 9 shows an exemplary embodiment for calculating a new reference profile 200 depending on the ambient parameters of temperature T, atmospheric pressure $p_{atm}$ and relative humidity rH. In this embodiment variant, each measurement point $p_{std}(t_1) \ldots p_{std}(t_n)$ of an already known standard reference profile is transformed to a current reference profile by way of a dedicated function $f_1 \ldots f_n$, which is dependent on the ambient parameters. In the diagram shown in FIG. 9, the ordinate axis represents a pressure axis and the abscissa axis represents a time axis.

If the combined gas law pV/T=constant and, additionally, a linear dependence (with slope b) of the humidity are used as a basis, the calculation of $p_{new}(t_1)$ is e.g.

$$p_{new}(t_1)=p_{std}(t_1) \cdot T_{new}(t_1)/T_{std}(t_1) \cdot b(t_1) \cdot rH_{new}(t_1)/rH_{std}(t_1) \quad \text{(Formula 5)}$$

By way of example, the parameter b(t) can be determined from a plurality of standard reference values for different ambient parameters by way of a parameter fit (individually for each time $t_n$!).

Depending on the nature of the test chamber 10 and the container 11, the humidity intake upon contact with ambient air and the emission under vacuum may additionally depend both on the humidity and on the temperature. Formula 5 should be extended accordingly.

In a further exemplary embodiment, standard reference profiles $p_{ref}(t)$, which were measured under known conditions, are initially respectively fitted using a function such as e.g. a polynomial function of at least fourth order.

$$f(t)=a \cdot t+b \cdot t^2+c \cdot t^3+d \cdot t^4 \quad \text{Formula 6}$$

Unlike in 6.1, it is not the measurement points of the curve but only parameters of the fitted function f(t) that are stored in the measurement system and used for the evaluation. The advantage lies in less data to be stored and data that can be processed more quickly; secondly, the reference profile is smoothed by the fitting.

The pre-factors of the polynomial are determined in turn as functions depending on T, p and rH from a plurality of such smooth reference profiles (for example by parameter fitting).

Then, the reference profile for the new ambient conditions is generated from these pre-factor functions:

$$p_{new}(t)=a(T,p,rH) \cdot t+b(T,p,rH) \cdot t^2+c(T,p,rH) \cdot t^3+d(T,p,rH) \cdot t^4 \quad \text{Formula 7}$$

In contrast to variant 6.1, this embodiment variant tends to require fewer fit parameters and a shorter calculation time. However, the selection of suitable pre-factor function tends to be more difficult.

6.3 Comparison with a Library of Reference Profiles

In a further exemplary embodiment, reference profiles are recorded in a systematic grid of defined ambient conditions, in particular at temperatures and humidities in the range relevant to operation (e.g.: temperature in 1.5 K steps between 15 and 30° C. and, simultaneously, the humidity from 20% rH to 50% rH in 5% rH steps). The reference profile is stored in the test system (in the example n=60).

Using this embodiment variant, possible fitting errors as in variants 6.2 and 6.3 are excluded as a matter of principle. However, an expedient variant, in this case too, is that of fitting each individual curve in advance to e.g. a polynomial function and only storing the pre-factors.

A disadvantage lies in the necessity of a sufficiently fine gradation and, in particular, in a corresponding outlay for measuring the multiplicity of defined reference profiles.

6.4 Combinations of the Aforementioned Variants

The aforementioned variants can be combined with one another. In particular, reference profiles as in 6.4 can be stored in the memory with only a coarse gradation of the ambient conditions (e.g. a temperature gradation of 5 K) and an interpolation according to 6.3 could be effectuated therebetween.

7 Identifying Disturbances in the Pressure Signal

Figure 10:
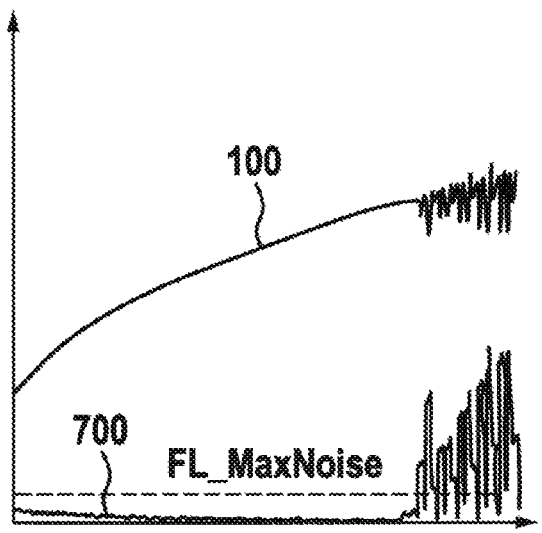
FIG. 10 is a schematic view of a noise identification of a pressure signal during the method according to the exemplary embodiment of the invention.

If peaks as in FIG. 10 occur in the signal, a slope value that is much too large or much too small might result. In order to detect such signal disturbances, it is possible to form, in a sliding manner over n measurement points, the standard deviation 700, which is calculated, in particular, in a sliding manner, after a time FL_T Noise and said standard deviation can be compared to an upper limit FL_maxNoise. In the diagram shown in FIG. 10, the ordinate axis represents a pressure axis and the abscissa axis represents a time axis.

8 Identifying a Faulty Chamber Seal 8.1 Multi-Step Increase in the Pressure Curve The slope dp/dt of the test pressure profile 100 ideally decreases between t4 and t8 and it is positive (a negative slope would indicate leakiness of the reference branch 8 or an expansion of the residual volume). By way of example, if the interplay between an O-ring, the groove and the counter surface does not work in an ideal fashion (i.e. no immediate complete sealing effect from the chamber interior to the groove and to the outside), multi-step pressure curves may occur, as on the left of FIG. 11. In the shown diagram, the ordinate axis represents a pressure axis and the abscissa axis represents a time axis. Shown therein is a section of a test pressure profile 100 and a curve of a first derivative 110 of the test pressure profile 100.

Figure 11:
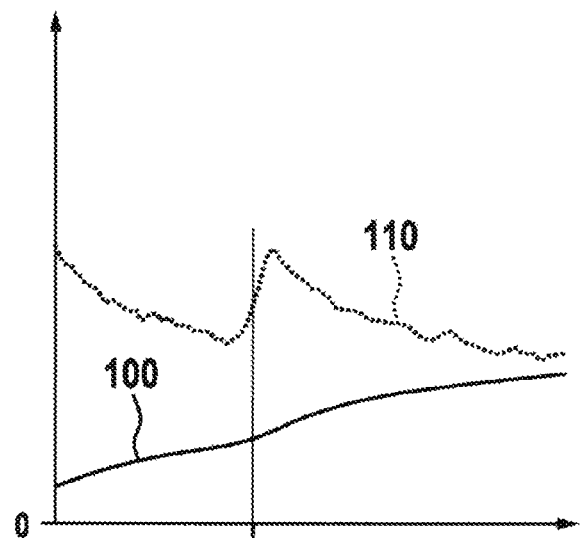
FIG. 11 is a schematic view of an identification of a defective seal of the measurement apparatus during the method according to the exemplary embodiment of the invention.

Such steps in the increase can be identified, for example, by calculating and analyzing piecewise slopes, as illustrated on the right of FIG. 11 (in this case slopes of the pressure curves illustrated on the left, calculated in a sliding manner over 21 points).

8.2 Dispersion of the Slope Values

An indication for a reducing sealing effect of the chamber, for example by rubber abrasion or another contamination of the sealing surface, is that the dispersion (e.g. expressed as a standard deviation) of the slopes m1 of the last n measurements deviates significantly from the expected value FL_MaxSlopeDev (PS F18). This threshold preferably lies below the acceptance criterion in order to adopt measures such as a deactivation of the chamber or a stop for cleaning of the seal in good time before the test result is influenced.

9 Determining the Start Time of the Fine Measurement

FIG. 12 shows typical examples of a pressure profile using a differential pressure sensor 6. In the shown diagram, the ordinate axis represents a pressure axis and the abscissa axis represents a time axis. Closing the measurement valve 5 defines the start of the fine measurement. This time can be determined from the test pressure profile 100 as set forth below.

In a preferred embodiment variant, the slope of the test pressure profile 100 is evaluated around the intended switching point, e.g. in an interval+/−200 ms.

If there is equal pressure on both sides of the differential pressure sensor 6 prior to closing the measurement valve 5, i.e. if there is a constant zero level, the differential pressure increases after closing the valve at the time t4.b (in practice, this even occurs in the case of an empty pressure chamber 10 on account of residual leakiness, outgassing, etc.). The onset of the increase can be used as indication of the valve closure of the measurement valve 5 and hence of the start of the fine measurement. This becomes clear from the first differential pressure curve 500.

If the measurement valve 5 is closed still during the pressure equalization between the measurement branch 7 and the reference branch 8 at the time t4.a in a sub-variant, the switching point should be selected in such a way that the slope is different before and after the valve closure of the measurement valve 5. With the second differential pressure curve 501, FIG. 12 shows the critical case with a continuous transition of the curve from the pressure equalization region (to the left of t4.a) into the fine measurement region (to the right of t4.a).

There is another variant for identifying the valve closure if a sufficiently large amount of gas is situated on at least one side of the differential pressure sensor 6, the compression (or relaxation) of said gas amount when the measurement valve 5 is closed leading to a step in the pressure profile. This is realized in the third differential pressure curve 502.

10 Predictive Maintenance of the Valves

In addition to the switching point of closing the measurement valve 5, it is possible to determine further switching points from the test pressure curve 100, it being possible to deduce wear from the delays thereof in relation to the intended point, said wear being expressed as sluggishness of the valves. The following examples relate to a test cycle as highlighted in FIG. 5.

a) Opening of the measurement valve 5
The absolute pressure signal exceeds a threshold or the differential pressure signal drops below a threshold at the start of the coarse leak test (t2).

b) Closing of the measurement valve 5
See 9 c) Opening of the ventilation valve 9
The differential pressure signal exceeds a threshold at the end of the fine leak test.

d) Opening of the vacuum valve 2
The absolute or differential pressure drops below the threshold at the start of the evacuation phase.

11 Identification of Liquid Leaks

Figure 13:
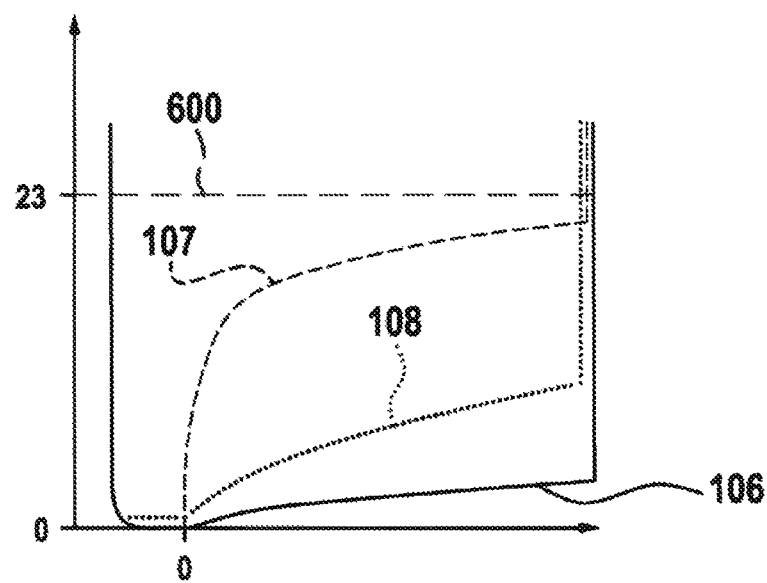
FIG. 13 is a schematic view of an identification of a liquid leak during the method according to the exemplary embodiment of the invention.

In the case of a container 11 that has been partly filled with liquid, liquid may emerge through a leak and it may vaporize upon contact with the vacuum of the pressure chamber 10 provided that the pressure in the measurement chamber lies below the saturation vapor pressure 600. As illustrated in FIG. 13, an initially steep pressure increase that tends asymptotically toward the saturation vapor pressure 600 (fourth test pressure profile 107) is characteristic, particularly in the case of a minimized residual volume, while air leakage in the case of conventional headspace volumes (ml range) and leak dimensions to be tested in the μm range exhibits a virtually linear profile (fifth test pressure profile 105). Therefore, it is possible to distinguish between air and liquid leakage. In the shown diagram, the ordinate axis represents a pressure axis and the abscissa axis represents a time axis.

The invention claimed is:

1. A method for testing a container (11) having an interior volume (12) for tightness, comprising the following steps:
positioning the container (11) in a pressure chamber (10) and reducing pressure within the pressure chamber (10) or increasing pressure within the container (11) to a predefined test pressure,
ascertaining a pressure profile (100) within the pressure chamber (10) over time,
comparing the pressure profile (100) to a reference profile (200) in order to determine whether a leak is present within the container (11),
measuring ambient conditions of the container (11) and/or the pressure chamber (10); and
adapting the reference profile (200) by matching the ambient conditions.

2. The method according to claim 1, characterized in that adapting the reference profile (200) is effectuated by ascertaining the pressure profile (100) in the case of at least one reference container with a predefined opening or a reference body and by setting the pressure profile (100) as a new reference profile (200).

3. The method according to claim 1, characterized in that adapting the reference profile (200) is effectuated by calculating a new reference profile (200) from an obsolete reference profile (201) on the basis of a modification of a parameter of the ambient conditions.

4. The method according to claim 3, characterized in that the new reference profile (200) is calculated from the obsolete reference profile (201) by a point-wise transformation or interpolation or is determined by a selection from a library with predetermined reference profiles (200).

5. The method according to claim 1, characterized in that peaks in the pressure profile (100) are identified and removed from the pressure profile (100) or the associated measurement is discarded and repeated, wherein a peak corresponds to a measurement value of the pressure profile (100) which, in comparison with further measurement values, has a dispersion that exceeds a predetermined value.

6. The method according to claim 1, characterized in that faulty seals of the pressure chamber (10) are identified by virtue of steps in the pressure profile (100) being ascertained or slopes of a plurality of ascertained pressure profiles (100) having a dispersion which exceeds a predetermined value.

7. The method according to claim 1, characterized in that liquid leaks are identified by virtue of the pressure profile (100) exhibiting a curve which, at least in part, asymptotically converges to a saturation vapor pressure, known in advance, of a liquid emerging from the liquid leak.

8. The method according to claim 1, characterized in that only linear portions of the pressure profile are taken into account in the comparison step.

9. The method according to claim 1, characterized in that a differential pressure curve between a reference line (8) and a measurement branch (7) connected to the pressure chamber (10) is determined by way of a differential pressure sensor (6), wherein both the measurement branch (7) and the reference line (8) are blocked by way of a measurement valve (5) in order to undertake a fine measurement of the pressure profile, and wherein a start of the fine measurement is assumed as such a point within the differential pressure curve at which the differential pressure curve or a slope of the differential pressure curve has a discontinuity.

10. A non-transitory machine-readable storage medium having a computer program with program code for carrying out the method according to claim 1 when the computer program is executed on a computing apparatus.

\* \* \* \* \*